US011444970B2

(12) United States Patent
Melson et al.

(10) Patent No.: US 11,444,970 B2
(45) Date of Patent: Sep. 13, 2022

(54) DYNAMIC SECURITY TEST SYSTEM (71) Applicant: Target Brands, Inc., Minneapolis, MN (US)

(72) Inventors: Paul Melson, Minneapolis, MN (US); Chris Carlson, Minneapolis, MN (US); Eric Brandel, Minneapolis, MN (US); Caleb Walch, Minneapolis, MN (US); Richard Agostino, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 0 days.

(21) Appl. No.: 17/009,056

(22) Filed: Sep. 1, 2020

(65) Prior Publication Data
US 2021/0092146 A1    Mar. 25, 2021

Related U.S. Application Data (60) Provisional application No. 62/905,054, filed on Sep. 24, 2019.

(51) Int. Cl.
*H04L 67/50* (2022.01)
*H04L 9/40* (2022.01)
*H04L 43/50* (2022.01)
*H04L 67/75* (2022.01)

(52) U.S. Cl.
CPC .......... *H04L 63/1433* (2013.01); *H04L 43/50* (2013.01); *H04L 67/535* (2022.05); *H04L 67/75* (2022.05)

(58) Field of Classification Search
CPC ..... H04L 63/1433; H04L 43/50; H04L 67/22; H04L 67/36; H04L 63/1416; H04L 63/145; H04L 63/1466; H04L 41/145; G06F 21/577; G06F 11/3688; G06F 21/552; G06F 21/566; G06F 11/3664; G06F 2221/2119; G06F 11/3684; G06F 11/3692; G06F 2221/033; G06F 2221/034; G06F 21/128; G06F 21/55; G06F 21/561; G06F 11/00;
(Continued)

(56) References Cited

U.S. PATENT DOCUMENTS

| 6,907,546 | B1 * | 6/2005 | Haswell | G06F 11/3684 |
| | | | | 714/38.11 |
| 7,562,304 | B2 | 7/2009 | Dixon et al. | |
| 8,689,333 | B2 | 4/2014 | Aziz | |

(Continued)

OTHER PUBLICATIONS

Kamil, Mustofa, "Methodology of Security testing of IKID website and Security Vulnerabilities", 2019, Annual Conference of Management and Information Technology (ACMIT), p. 1-8 (Year: 2019).*

(Continued)

*Primary Examiner* — Taylor A Elfervig
(74) *Attorney, Agent, or Firm* — Fish & Richardson P.C.

(57) ABSTRACT

A website vulnerability test is performed by automatically checking that a website has not been compromised by malicious third party scripts. A system can test a dynamic behavior of a website that indicates a functional user flow through the website. Instead of merely analyzing static code of a website, the system automatically tests the website in their runtime environments for the presence of malicious third party scripts.

20 Claims, 6 Drawing Sheets

(58) Field of Classification Search
CPC . G06F 11/3672; H04W 12/128; H04W 12/12; H04W 12/06; G05B 23/0256
USPC ............................................ 702/122
See application file for complete search history.

(56) References Cited

U.S. PATENT DOCUMENTS

| | | | |
|---|---|---|---|
| 8,881,282 B1 | 11/2014 | Aziz et al. | |
| 9,015,844 B1* | 4/2015 | Franklin | G06F 21/577 |
| | | | 726/25 |
| 9,104,867 B1* | 8/2015 | Thioux | G06F 21/566 |
| 9,436,763 B1 | 9/2016 | Gianos et al. | |
| 2002/0083213 A1* | 6/2002 | Oberstein | G06F 11/3684 |
| | | | 719/313 |
| 2009/0100345 A1* | 4/2009 | Miller | G06F 11/3668 |
| | | | 715/738 |
| 2019/0235998 A1* | 8/2019 | Fisher | G06F 16/958 |
| 2021/0314353 A1* | 10/2021 | Melson | H04L 63/0861 |
| 2021/0385245 A1* | 12/2021 | Melson | H04L 63/1483 |

OTHER PUBLICATIONS

S. Mungekarand D. Toradmalle, "WTaaS: An architecture of website analysis in a cloud environment," 2015 1st International Conference on Next Generation Computing Technologies (NGCT), 2015, pp. 21-24 (Year: 2015).*

S. Sandhya, S. Purkayastha, E. Joshua and A. Deep, "Assessment of website security by penetration testing using Wireshark," 2017 4th International Conference on Advanced Computing and Communication Systems (ICACCS), 2017, pp. 1-4, (Year: 2007).*

J. Arora, "Web testing using UML environment models," 2016 International Conference on Computing, Communication and Automation (ICCCA), 2016, pp. 785-789 (Year: 2016).*

* cited by examiner

DYNAMIC SECURITY TEST SYSTEM

CROSS-REFERENCE TO RELATED APPLICATIONS

This application claims the benefit of U.S. Provisional Application Ser. No. 62/905,054, filed Sep. 24, 2019. The disclosure of the prior application is considered part of (and is incorporated by reference in) the disclosure of this application.

TECHNICAL FIELD

This document generally describes technologies for a network security test of a network resource, such as websites.

BACKGROUND

A website vulnerability is a weakness or misconfiguration in website code that allows an attacker to breach one or more security mechanisms on the site, which can permit attackers to, for example, gain some level of control over or access to sensitive information on the site. There are several types of well-known website vulnerabilities that have been exploited by attackers, such as SQL injection vulnerabilities, cross-site scripting (XSS), command injection, file inclusion, and cross-site request forgery (CSRF). SQL injection vulnerabilities refer to areas in website code where direct input from a client device can be passed to a database. Bad actors utilize these forms to inject malicious code into a website's database, such as by injecting malicious/spam posts into a site, stealing customer information, or bypassing authentication to gain full control of the website. XSS occurs when attackers inject scripts through unsanitized user input or other fields on a website to execute code on the site. Browsers are unable to discern whether or not such cross-site scripts are intended to be part of the website, resulting in malicious actions being performed by cross-site scripts, such as session hijacking, spam content being distributed to unsuspecting visitors, and stealing session data. Command injection vulnerabilities allow attackers to remotely pass and execute code on the website's hosting server. File inclusion attacks use inclusion functions in server-side web application languages (e.g., PHP) to execute code from a remotely stored malicious file. CSRF attacks trick site users or administrators to unknowingly perform malicious actions for the attacker, such as changing order values and product prices, transferring funds from one account to another, or changing user passwords to hijack accounts.

Website administrators may manually analyze website code to identify vulnerabilities. For example, a website crawl and audit may be manually or automatically used to discover vulnerabilities by, for example, working statically with each link interacting with a server.

SUMMARY

The present disclosure relates to systems, methods, devices, and computer program products for network security tests, such as website vulnerability tests. For example, the technologies described herein provide a system for automatically checking and detecting whether a website has been compromised by malicious third party scripts. In particular, website code can be loaded and evaluated in a runtime testing environment on a client computing device, which can simulate user processes on the website, such as potentially sensitive functional user flows like purchasing items in an online store, logging in to a user account, and accessing private account information. Such a runtime testing environment can capture and record the dynamic behavior of the website during these functional user flows on the website, and this dynamic behavior of the website can be evaluated to detect the potential presence of malicious third party scripts.

Network security systems described herein provide a security check that either validates a website as secure or prompts an investigation into the potential security vulnerability. Instead of merely analyzing static code of websites, the technologies herein can automatically test the websites in their runtime environments (e.g., as loaded and interpreted on client computing devices) for the presence of malicious third party scripts. Websites may be exposed to vulnerabilities from third party scripts that are unwittingly injected into websites, such as through security holes in third party libraries that are embedded in the websites directly from thrusted third party vendors to provide website content. Malicious third party scripts can be difficult to identify with static analysis and can go unnoticed because they employ variety security attacks that are often sophisticated and obfuscated. Additionally, by the nature of third party scripts being injected into websites as they are interpreted by a client device, analysis of the website's own codebase will not reveal a problem. Similarly, even analysis of the third party scripts that are included as part of a website may not yield identification of malicious code, which can be obfuscated from detection. These types of attacks have been encountered, for example, in several credit card skimming attacks in which third party scripts were used on checkout pages, login pages, account settings, and in other secure website processes to obtain private and sensitive user information.

The technologies herein provide a platform and system architecture that dynamically tests a website in its runtime environment and monitors operations that are performed as part of the website while a functional user flow is performed on the website, such as an automated checkout process in an online store. Such dynamic test can reveal vulnerabilities in a website that would not be apparent from static analysis. For example, website administrators may be unaware of some third party scripts residing on various webpages, and vulnerabilities related to those scripts can be missed by static analysis. Further, business processes can be difficult to test, and source code may not be fully covered by static analysis.

The platform and system architecture described herein can generate and run automation scripts on the website to simulate user interactions with the website (e.g., login, checkout process with payment information, etc.). The system can run the test without modifying the website codes. For example, the test can be performed by redirecting the original native function calls and recording what is run within an isolated environment. In addition or alternatively, the test can be performed by copying the codes and executing them with the automation scripts in an isolated environment.

As the automation scripts are run on the website, the system can log all the behavior of the website. A variety of aspects can be recorded, such as IP addresses being redirected, ports accessed, ongoing requests, incoming responses, data being transmitted, timing of the transmission, other events occurring as a result of executing the website, URLs of various resources to/from which requests/responses/data are transmitted, etc. The log can be used to identify any anomalies in the behavior of the website, which can represent potential presence of malicious third party scripts on the website. The system can also permit for reports to be automatically generated when vulnerabilities (e.g., any abnormal behavior of the website) are detected.

In addition, the technologies described herein can also be used to automatically check and detect whether a website has been compromised by other types of malicious scripts such as inline scripts and first party scripts. For example, inline scripts includes scripts written in an <script> block within the webpage that is loaded. First party scripts include scripts that are included in separate files (e.g., .js files) and located on the same domain name as the webpage. Third party scripts include scripts that are included in separate files (e.g., .js files) and located on another domain.

For example, malicious first party scripts can appear on a website in various scenarios, and the technologies described herein can dynamically test and identify such malicious first party scripts in the same or similar manner as they do for malicious third party scripts. In one scenario, malicious first party scripts can appear on a target website through supply chain attacks. For example, an attacker compromises a script that can be used on sensitive pages (e.g., checkout page). The compromised script may be added to various online repositories (e.g., Npm™, Bower™, etc.), and pulled into a build process for the website automatically. In another scenario, a malicious first party script can appear on a website if an external entity has compromised the system that manages the website. For example, a malicious code may be placed directly onto the website, thereby ending up being a first party script. In yet another scenario, a malicious code may be added to the website by a malicious insider.

Particular embodiments described herein include a method for testing a website vulnerability. The method include retrieving website code of a website, the website code including a script; executing the website code with automation script, the automation script simulating a user interaction with the website; monitoring a dynamic behavior of the website including a functional user flow through the website based on the simulated user interaction; and generating a log of the dynamic behavior.

In some implementations, the system can optionally include one or more of the following features. The method may further include receiving a user input of a URL of the website; and transmitting the URL to a web server to retrieve the website code of the website. Executing the website code may include hooking a plurality of attributes in runtime of the website. The plurality of attributes may include one or more of IP addresses being redirected, ports accessed, ongoing requests, incoming responses, data packets being transmitted, timing of the transmission, URLs of various resources to/from which requests/responses/data are transmitted, cookies, and downloads, other events occurring as a result of executing the website, function calls, messages, and network traffic. The script may be a third party script, and the method may further include downloading the website code from a web server; and downloading the third party script from a third party script server different from the web server. Executing the website code may include executing code of each of a plurality of webpages in the website. The method may further include receiving a website testing wrapper for execution of the website code. The website testing wrapper may include a user input automation engine configured to generate simulated user inputs based on the automation script. The website testing wrapper may include a hooking engine configured to intercept runtime operations of the website. The method may further include transmitting the log to a server computing device.

Particular embodiments described herein include a client computing device for testing a website vulnerability. The system include a data processing apparatus; and a memory device storing instructions that when executed by the data processing apparatus cause the server to perform operations comprising: receiving website code of a website, the website code including a script; executing the website code with automation script, the automation script simulating a user interaction with the website; monitoring a dynamic behavior of the website including a functional user flow through the website based on the simulated user interaction; and generating a log of the dynamic behavior.

In some implementations, the system can optionally include one or more of the following features. The operations may further include receiving a user input of a URL of the website; and transmitting the URL to a web server to retrieve the website code of the website. Executing the website code may include hooking a plurality of attributes in runtime of the website. The plurality of attributes may include one or more of IP addresses being redirected, ports accessed, ongoing requests, incoming responses, data packets being transmitted, timing of the transmission, URLs of various resources to/from which requests/responses/data are transmitted, cookies, and downloads, other events occurring as a result of executing the website, function calls, messages, and network traffic. The script may be a third party script, and the operations may further include downloading the website code from a web server; and downloading the third party script from a third party script server different from the web server. Executing the website code may include executing code of each of a plurality of webpages in the website. The operations may include receiving a website testing wrapper for execution of the website code. The website testing wrapper may include a user input automation engine configured to generate simulated user inputs based on the automation script; and a hooking engine configured to intercept runtime operations of the website. The operations may further include transmitting the log to a server computing device.

Particular embodiments described herein include a non-transitory computer-readable medium having stored therein a program for causing a computer to execute a process of testing a website vulnerability. The process may include receiving a user input of a URL of a website; transmitting the URL to a web server to retrieve the website code of the website; receiving website code of the website from the web server, the website code including a third party script; receiving the third party script from a third party script server different from the web server; executing the website code with automation script; generating simulated user inputs based on the automation script; monitoring a dynamic behavior of the website interacting with the simulated user inputs; generating a log of the dynamic behavior; and transmitting the log to a server computing device.

The devices, system, and techniques described herein may provide one or more of the following advantages. For example, some embodiments described herein include a system that automates dynamic testing of a functional user flow through a website (e.g., a checkout page) to expose vulnerabilities from third party scripts. Therefore, the system can reveal any suspicious behavior on a website resulting from malicious scripts that have been secretly injected into trusted third party libraries on the website in a way that is not apparent from static analysis (e.g., due to obfuscation of the third party scripts). Such identification of malicious third party scripts affecting a website may otherwise not be possible, and may be a point of uncertainty for website owners and managers regarding website security. The disclosed technology can assist in verifying that a website is free of such malicious third party scripts, and can also aid in detecting and neutralizing potential threat vectors when they exist.

In another example, the network security system can permit for automation scripts to be generated and run with website code in an isolated environment. Further, such automation scripts can simulate dynamic behavior of the website as if a user interacts with checkout page or other secured pages on the website. Therefore, security analysis of a website can be performed without affecting actual client devices that interact with the website.

In another example, the system herein can log the dynamic behavior of the website, and generate a report that can be used to identify any vulnerabilities on the website. The log can be used as a reliable source to identify any anomalies in the behavior of the website that can result from malicious third party scripts on the website. The reports can be used for further investigation of the vulnerabilities of the website.

In another example, the system herein can perform further attribution against scripts (e.g., first party scripts, third party scripts, etc.) by analyzing the log data. Some examples of behavior captured in the logs include dynamically loading additional scripts, adding third-party trackers, listening and recording keyboard events, adding or modifying elements on the webpage, and creating HTML elements that make network requests to third-party servers.

The details of one or more implementations are set forth in the accompanying drawings and the description below. Other features and advantages will be apparent from the description and drawings, and from the claims.

DETAILED DESCRIPTION OF ILLUSTRATIVE EMBODIMENTS

In general, the technologies described herein provide a system for automatically checking and detecting whether a website has been compromised by malicious scripts (e.g., first part scripts, third party scripts, inline scripts, etc.). In particular, website code can be loaded and evaluated in a runtime testing environment on a client computing device, which can simulate user processes on the website, such as potentially sensitive functional user flows like purchasing items in an online store, logging in to a user account, and accessing private account information. Such a runtime testing environment can capture and record the dynamic behavior of the website during these functional user flows on the website, and this dynamic behavior of the website can be evaluated to detect the potential presence of malicious scripts.

Although the technologies are described herein primarily with examples of third party scripts, it is understood that the technologies can be applied in the same or similar manners to other types of scripts such as first party scripts which may contain malicious code.

Figure 1:
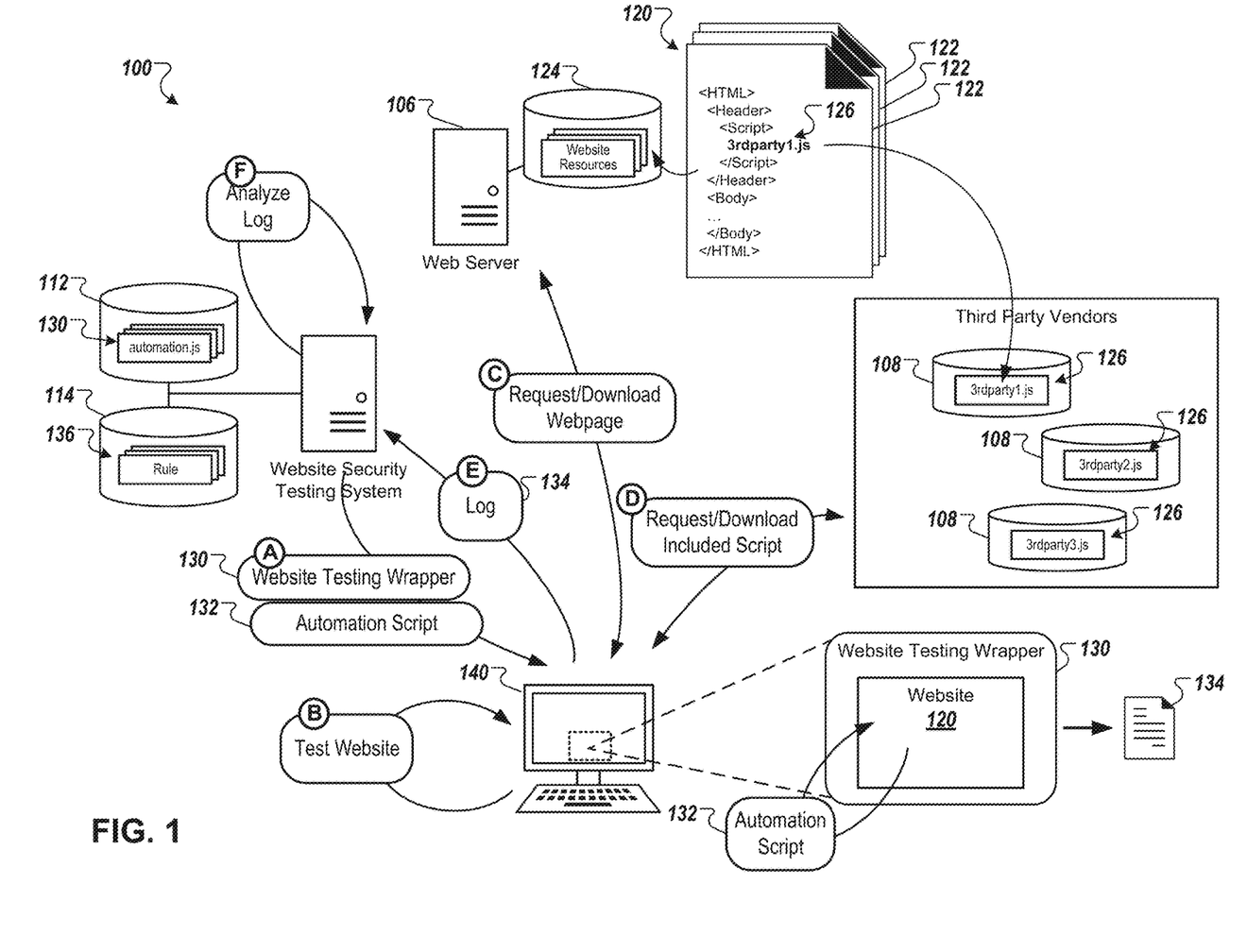
FIG. 1 is a block diagram of an example network architecture for website vulnerability testing.

FIG. 1 is a block diagram of an example network architecture 100 for website vulnerability testing of the present disclosure. The network architecture 100 includes a website security test system 102, a test client device 104, a web server 106, and a third party script server 108. The entities in the network architecture 100, such as the website security test system 102, the test client device 104, the web server 106, and the third party script server 108, are communicatively coupled to one or more networks.

The website security test system 102 stores and manages a website test tool, such as a website testing wrapper 130. The website security test system 102 can transmit the website test tool to the test client device 104 for vulnerability testing as described herein. The website security test system 102 can manage a plurality of automation scripts that are stored in an automation scripts database 112. In addition, the website security test system 102 can manage one or more security testing rules 136 stored in a testing rules database 114. Testing rules can be used to analyze records of dynamic behavior of websites and determine any malicious third party scripts included in the websites.

The test client device 104 is used to access a website (e.g., one or more webpages thereof) from the web server 106 and perform security vulnerability of the website. The test client device 104 can be dedicated for security vulnerability testing for websites. For example, the test client device 104 can be a computing device only for the website security testing described herein, and is not an actual client device in the network (e.g., a network client or host). In alternative implementations, an actual network client device can be used as the test client device 104. The test client device 104 can provide an isolated environment for such testing. The test client device 104 can be a physical computing device, a virtual machine, or any other systems that can provide isolated runtime environments for websites.

The test client device 104 can run a web browser for a user to access the website being tested. In addition or alternatively, the test client device 104 executes a website testing tool (e.g., the website testing wrapper) to perform vulnerability testing on the website.

The web server 106 operates to host one or more webpages 122 of a website 120. The web server 106 connects to a website resources database 124 storing code (e.g., HTML, scripts (e.g., Javascripts), style sheets, server-side code, client-side code, etc.) that the web server 106 executes and/or distributes to provide the webpages 122 on client devices. The webpages 122 can be considered to collectively be a website 120 that is hosted by the web server 106.

A website is a collection of network web resources, such as static assets (images, fonts, embedded videos, HTML, JavaScript, style-sheets, etc.), and server-side code which are typically identified with a common domain name and published on a web server. A website can be of various types, such as a static website and a dynamic website (also referred to as a web application). A static website has web pages stored on the server in the format that is sent to a client web browser. It may be coded in Hypertext Markup Language (HTML) and Cascading Style Sheets (CSS) used to control appearance beyond basic HTML. Images are commonly used to effect the desired appearance and as part of the main content. Audio or video might also be considered static content if it plays automatically or is generally non-interactive. This type of website usually displays the same information to all visitors. A dynamic website (or a web application) is a website that changes or customizes itself frequently and automatically. Server-side dynamic pages are generated on the fly by computer code that produces the HTML with CSS. There are a wide range of software systems, such as CGI, Java Servlets and Java Server Pages (JSP), Active Server Pages, Node.js, and ColdFusion (CFML), which are available to generate dynamic web systems and dynamic sites.

By way of example, an example of a website to be tested for vulnerability to security attacks may be an online shopping website in which a user connects to the website through a web browser, and save shopping items in a shopping cart, sign in the user's account by entering a username/password combination, and/or check out with payment. The automation script, when executed, can simulate such user interaction with the website.

The third party script server 108 operates to host one or more third party scripts 126 that can be included in a website 120. The third party script server 108 can be separate from the web server 106 and provide scripts to be directly embedded to the website hosted by the web server 106.

Third party scripts 126 are scripts (e.g., JavaScript) that can be embedded into a website directly from third-party vendors. Third party scripts 126 may provide a range of functionalities that make a website more dynamic and interactive, and/or generate a revenue stream. Such scripts can include ads, analytics, widgets and other suitable scripts for other functionalities. Examples of third-party scripts include social sharing buttons (e.g., Twitter, Facebook, G+, etc.), video player embeds (e.g., YouTube, Vimeo, etc.), advertising iframes, analytics & metrics scripts, AB testing scripts for experiments, helper libraries (e.g., date formatting, animation, functional libraries, etc.).

By way of example, where a website is an online shopping website, many third party scripts, such as login, checkout, payment, and other sensitive processes, can be downloaded and run with the website code. As described herein, such third party scripts can create vulnerabilities in the website, and malicious code is injected into the third party scripts. For example, third party scripts for payment process can be compromised with malicious code for scrapping user's sensitive data (e.g., credit card information) by listening to user's keystrokes. In addition or alternatively, attackers can create malicious scripts and inject them into the website directly. Numerous third party scripts can be embedded in website code in such a way that they look like part of normal website code without revealing any malicious lines. Therefore, static code analysis does not identify all of such scripts until the scripts are actually executed on client devices. As described herein, dynamic analysis described herein can monitor and log the behavior of a website with third party scripts embedded therein when the website is run through a web browser (and/or the website testing wrapper) on a client device.

Referring still to FIG. 1, an overall process for dynamic testing of website vulnerabilities is described. In Step A, the website security testing system 102 can transmit a website testing wrapper 130 and an automation script 132 to the test client device 104 so that vulnerability testing can be performed for a website 120 that has been identified to be tested for potential security vulnerabilities.

The website testing wrapper 130 is code designed to test a website in the test client device 104 with no or little modification of the website code. As described herein, the website testing wrapper 130 can execute the automation script 132 on the website code, and generate a dynamic website log 134 that indicate the behavior of the website in response to the automation script.

The automation script 132 is a script that automatically simulates a series of actions or inputs of a user that interact with a target website. The automation script can include operation of elements of the target website, modification of attributes of the elements, changes to the location of the elements in a document object model (DOM), and any other suitable actions against the target webpage. Such elements can be based on events that result from user interaction with a web browser. In some implementations, the automation script 132 can be derived from a functional test script to test potential vulnerabilities of a website.

The automation script 132, which is suitable for testing the target website 120, can be selected and retrieved from a plurality of automation scripts stored in the database 112. Alternatively, the automation script 132 can be created and/or formatted to be executable with the website 120 on the test client device 104.

In Step B, the test client device 104 operates to test the website 120, which causes the test client device 104 to request and download the webpages (Step C), and further to request and download the third party scripts and resources included in the webpages (Step D).

In Step C, the test client device 104 transmits a request for the website 120 to the web server 106. The web server 106 transmits the requested website 120 to the test client device 104, and the test client device 104 downloads the website 120 (e.g., webpages 122 thereof) from the web server 106.

In Step D, the test client device 104 transmits a request for the third party scripts 126 included in the webpages 122 to the third party script servers 108, which then transmits the requested third party scripts 126 back to the test client device 104. The test client device 104 downloads the third party scripts 126 from the third party script servers 108.

During the testing process (Step B), the webpages 122 including the third party scripts 126 can be accessed and presented with the website test wrapper 130, which can execute the automation script 132. The automation script 132 provides simulated user inputs to interact with the webpages 122. The website test wrapper 130 can generate a dynamic website log 134 that records all the behavior of the webpages 122 in response to the simulated user inputs provided by the automation script 132.

In Step E, the test client device 104 transmits the log 134 to the website security testing system 102. The log 134 can include various pieces of information indicative of a dynamic behavior of the webpages 122, which includes a functional user flow through the webpages resulting from the simulated user interaction with the webpages 122. For example, the log 134 can include information about function calls, messages, events, network traffic, data packets, cookies, downloads, and other data indicative of the website behavior.

In Step F, the website security testing system 102 can be used to analyze the log 134 to identify any malicious behavior of the website 120. A security administrator (e.g., a security analyst) can manually review the log 134, and identify any abnormal or malicious behavior of the website 120 and/or determine if any of the third party scripts have been compromised. Alternatively or in addition, the website security testing system 102 can automatically scan and analyze the log 134, and identify any abnormal or malicious behavior and/or compromised third party scripts.

In some implementations, the identification of anomalous behavior and/or compromised scripts can be performed based on one or more testing rules 114. The testing rules 114 can be designed to identify behavior of a website that differs from a predetermined sequence of a behavior of a website that interacts with a normal user input. In some implementations, an anomalous behavior can be determined by comparing the predetermined sequence of website behavior with the monitored behavior resulting from execution of the automation script.

Figure 2:
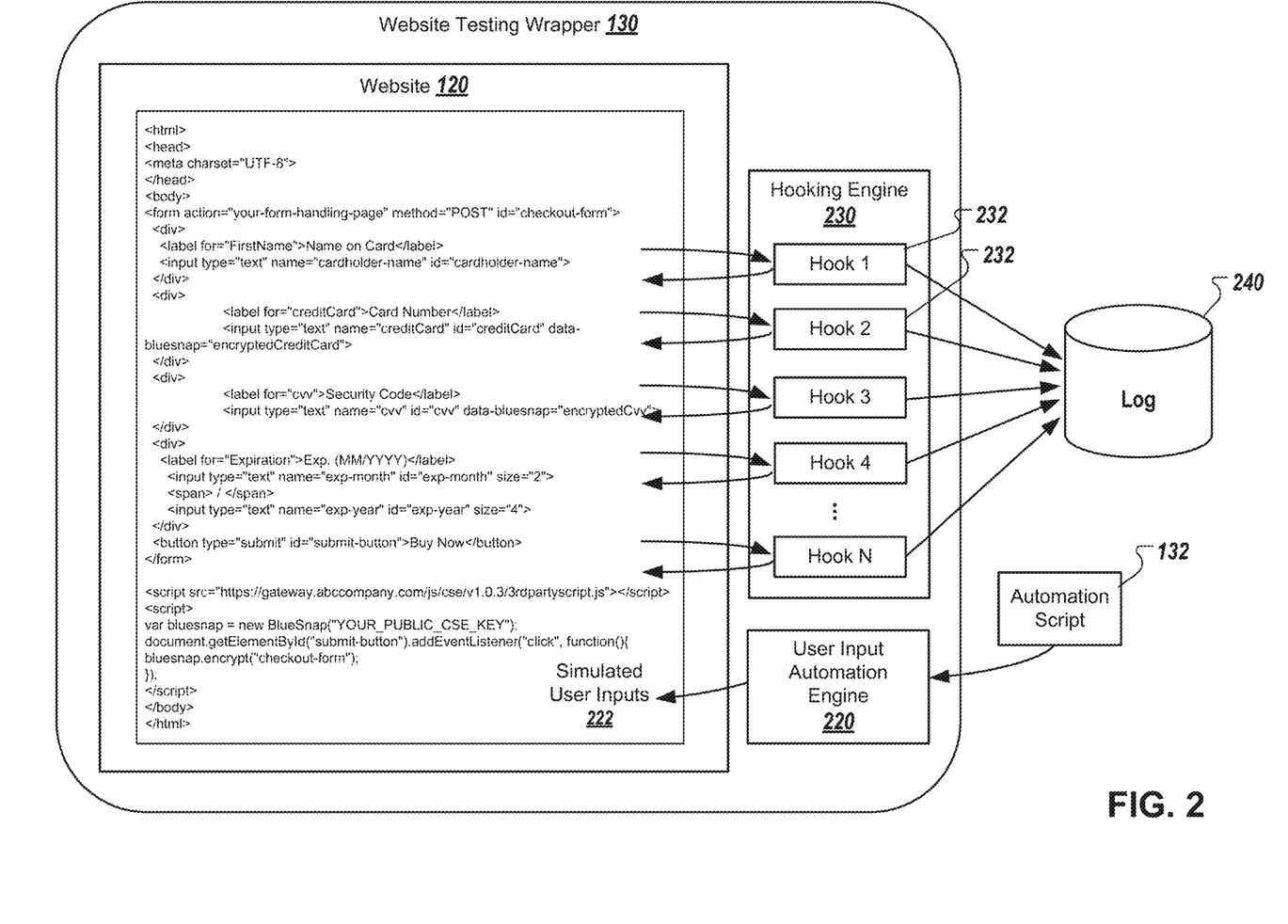
FIG. 2 illustrates an example method of performing dynamic security test of a webpage.

FIG. 2 illustrates an example method 200 of performing dynamic security test of a webpage 210. A webpage 210 can be one of the webpages 122 of the website 120 described in FIG. 1. The webpage 210 can be retrieved from a web server (e.g., the web server 106) and tested in the website testing wrapper 130.

The website testing wrapper 130 can include a user input automation engine 220 configured to simulate user inputs to the webpage 210. For example, the user input automation engine 220 can generate simulated user inputs 222 based on the automation script 132, and enable the simulated user inputs 222 to interact with the webpage 210.

The website testing wrapper 130 can monitor the dynamic behavior of the webpage 210. The dynamic behavior of the webpage 210 can include information indicative of a functional flow in response to the simulated user inputs 222. In some implementations, the website testing wrapper 130 can include a hooking engine 230 configured to monitor the behavior of the webpage being tested. For example, the hooking engine 230 is configured to intercept various operations performed in runtime of the webpage, which can include functional aspects of the webpage, such as function calls, messages, events, etc. that occur in the runtime of the webpage. The hooking engine 230 includes one or more hooks 232. Hooks 232 are code that handle such intercepted aspects (e.g., function calls, messages, events, etc.).

The hooking engine 230 of the website testing wrapper 130 can generate log data 240 that record the monitored behavior of the webpage 210. The log data 240 can be the dynamic website log 134 in FIG. 1. The log data 240 can be used to identify any anomalies in the behavior of the webpage that may result from malicious third party scripts embedded in the webpage.

Figure 3:
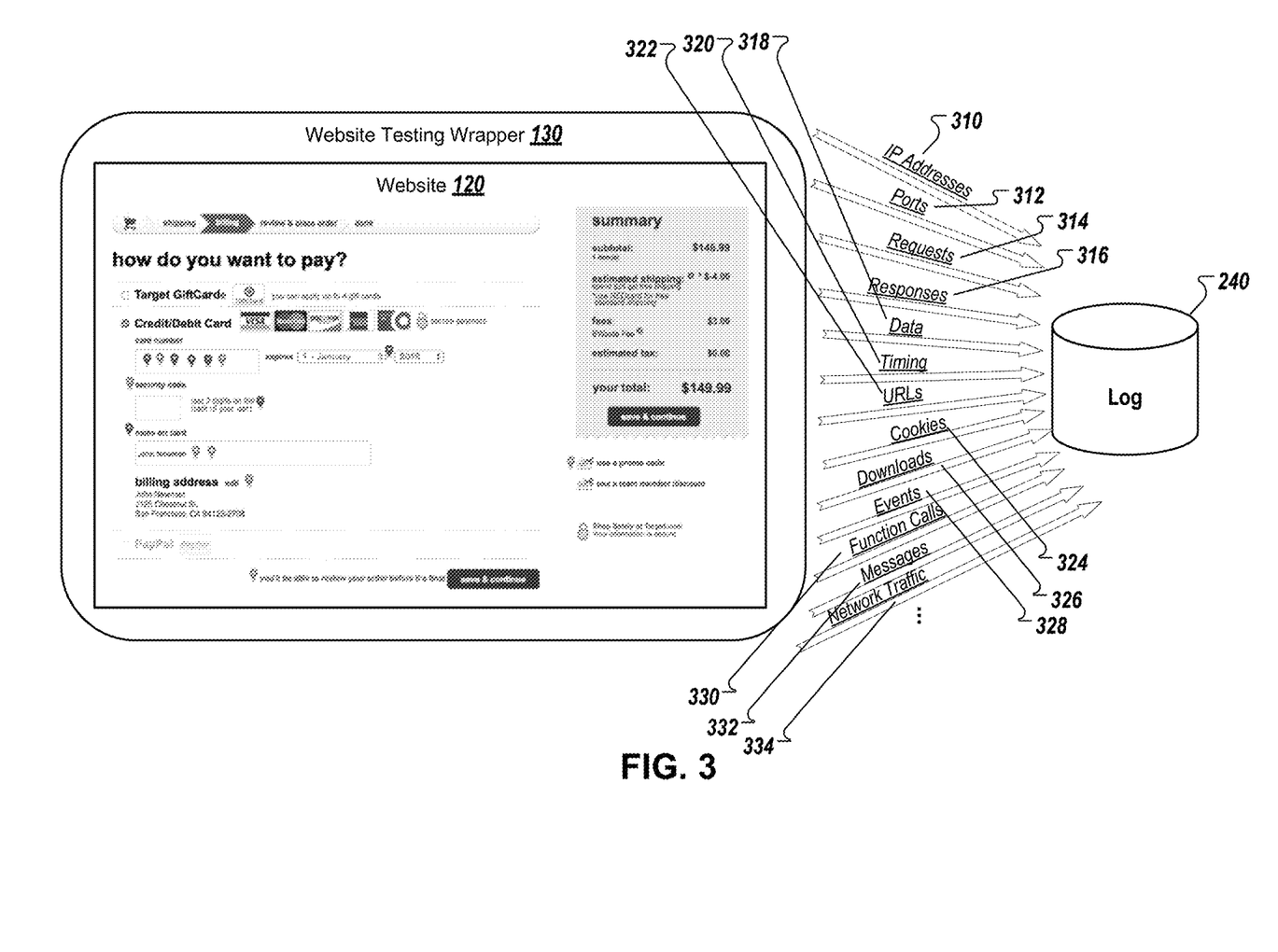
FIG. 3 illustrates example attributes that represent the dynamic behavior of a webpage being tested and is recorded as log data.

FIG. 3 illustrates example attributes that represent the dynamic behavior of a webpage being tested, and is recorded as log data 240. The log data 240 can be used as a source to identify any anomalies in the behavior of the website that can result from malicious third party scripts on the website. The log data 240 can be used to generate a report with which security administrators (e.g., security analysts) can further investigate and mitigate vulnerabilities of the website.

Various attributes can be obtained from the runtime test of the website described herein. Examples of such information include IP addresses 310 being redirected, ports 312 accessed, ongoing requests 314, server responses 316, data packets 318 being transmitted, timing 320 of the transmission, URLs 322 of various resources to/from which requests/responses/data are transmitted, cookies 324, and downloads 326, other events 328 occurring as a result of executing the website, function calls 330, messages 332, network traffic 334, and other pieces of information are monitored during the runtime test of the website.

A network traffic can be monitored by measuring various attributes of traffic, such as amount of traffic, type of traffic (e.g., web traffic, mail traffic, file transfer traffic, infrastructure traffic, remote control traffic, etc.), IP addresses (e.g., IP addresses of network devices, servers, clients, applications, etc.), ports accessed, protocols, bandwidth, etc. A network traffic can be analyzed by a packet sniffer. A packet sniffer intercepts and logs traffic passing over a network by capturing each packet.

A data packet is a formatted unit of data being transmitted to a network. A data packet includes payload and control information which provides data (e.g., source and destination network addresses, error detection codes, and sequencing information) for delivering the payload. Control information can be found in packet headers and trailers.

A cookie is a small piece of data sent from the website and stored on a user's computing device (e.g., the test client device) by the web browser while the user is browsing. Cookies are designed to permit for websites to remember stateful information (e.g., items added in the shopping cart in an online store) and/or to record the user's browsing activity (e.g., clicking buttons, logging in, recording visited pages, etc.). Cookies can further be used to record arbitrary pieces of information that the user has previously entered into form fields, such as names, addresses, passwords, and credit card numbers.

Cookies have various types, such as session cookies, persistent cookies, secure cookies, http-only cookies, same-site cookies, third-party cookies, supercookies, etc. Further, authentication cookies are cookies used by web servers to know whether the user is logged in or not, and which account they are logged in with. Authentication cookies allow the site to know whether to send a page containing sensitive information, or require the user to authenticate themselves by logging in. The security of an authentication cookie generally depends on the security of the issuing website and the user's web browser, and on whether the cookie data is encrypted. Security vulnerabilities may allow cookie's data to be read by a hacker, used to gain access to user data, or used to gain access (with the user's credentials) to the website to which the cookie belongs. Tracking cookies, such as third-party tracking cookies, are used as ways to compile long-term records of individuals' browsing histories.

Messages can include inputs generated by a system (e.g., an operating system on the test client device 104) and applications (e.g., a web browser launching the website being tested). A system can also generate messages in response to changes in the system brought about by an application. Further, a system can use messages to control the operations of applications and to provide input and other information for applications to process. An application can generate messages to perform tasks or communicate with other applications.

An event is an action or occurrence that may originate asynchronously from an external activity that needs to be handled by a program. An event is an entity which encapsulate the action and the contextual variables triggering the action. Events can be generated or triggered by a system, by a user, or in other ways. Events can be handled synchronously with a program flow. For example, the software may have one or more dedicated places where events are handled, frequently an event loop. A source of events (e.g., external activity) includes a user who may interact with the software by way of, for example, keystrokes on the keyboard. Another source is a hardware device such as a timer. Software can also trigger its own set of events into the event loop to, for example, communicate the completion of a task.

The events include user generated events, such as mouse events, keyboard events, joystick events, touchscreen events, and device events. For example, a pointing device can generate software recognizable pointing device gestures. A mouse can generate a number of mouse events, such as mouse move (e.g., direction of move and distance), mouse button controls, mouse wheel motion, or any combination thereof. Further, pressing a key, or a combination of multiple keys, on a keyboard generates a keyboard event which causes a currently running program to respond to data introduced by the keystroke. Moving a joystick generates an X-Y analogue signal which generates a joystick event. A joystick can have one or more buttons which also generate an event when pressed. A user interaction with a touchscreen can generate events which are referred to as touch events or gestures. Action by or to a device, such as a shake, tilt, rotation, move, etc., can generate device events.

Figure 4:
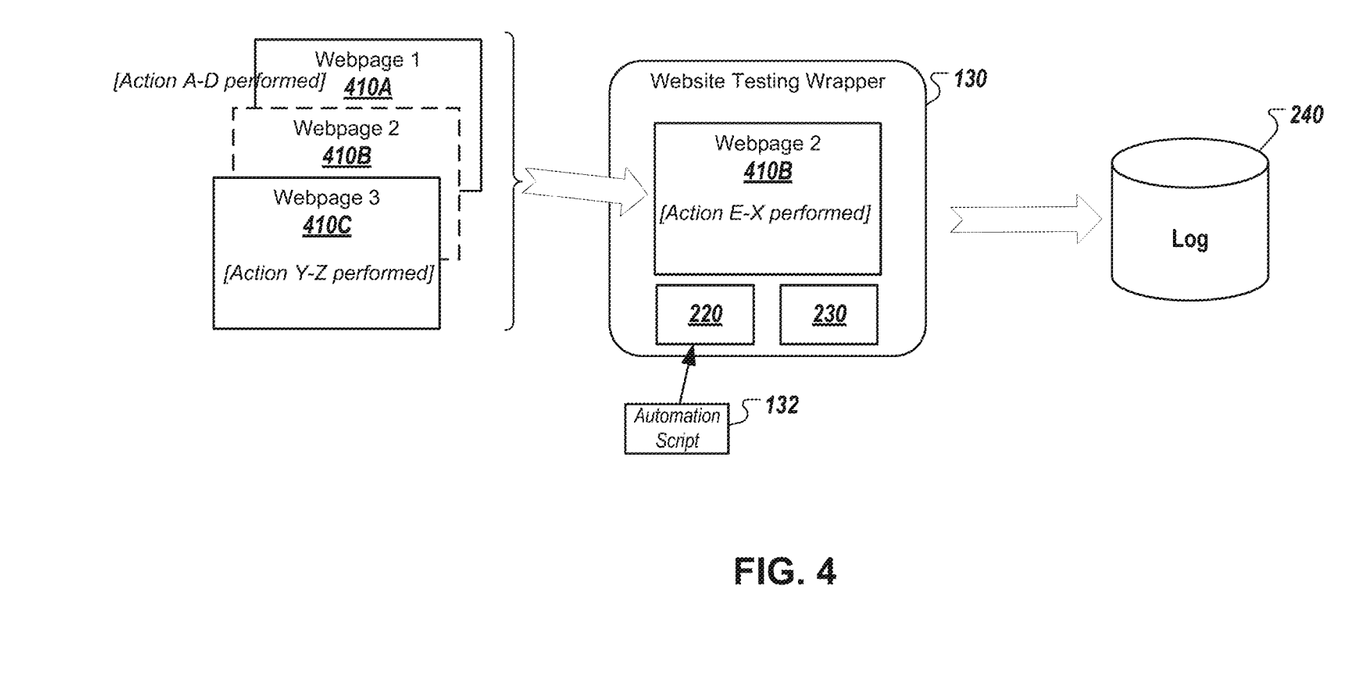
FIG. 4 illustrates an example method for performing dynamic security test of a plurality of webpages.

FIG. 4 illustrates an example method 300 for performing dynamic security test of a plurality of webpages 410 (including 410A, 410B, and 10C). The method 300 can be performed similarly to the method 200 of FIG. 2. The webpages 410 can be some or all of the webpages 122 of the website 120 described in FIG. 1. The webpages 410 can be retrieved from a web server (e.g., the web server 106) and tested in the website testing wrapper 130.

The website testing wrapper 130 can test each of multiple webpages 410 in the same or similar way described in FIG. 2. As described herein, the website testing wrapper 130 includes the user input automation engine 220 and the hooking engine 230. For each of the webpages 410, the user input automation engine 220 simulates user inputs based on the automation script 132 and enables the simulated user inputs to interact with that webpage. Further, the hooking engine 230 monitors and collects various aspects of each of the webpages in runtime.

In the illustrated example, the website testing wrapper 130 operates to test a first webpage 410A of a website (e.g., the website 120). The user input automation engine 220 simulates four user actions A through D with respect to the first webpage 410A, and the hooking engine 230 records the behavior of the first webpage 410A into the log data 240. Similarly, the website testing wrapper 130 operates to test a second webpage 410B of the website. The user input automation engine 220 simulates user actions E through X with respect to the second webpage 410B, and the hooking engine 230 records the behavior of the second webpage 410B into the log data 240. Similarly, the user input automation engine 220 simulates user actions Y and Z with respect to the third webpage 410C, and the hooking engine 230 records the behavior of the third webpage 410C into the log data 240. As a result, the log data 240 include information indicative of the behavior of the website having the first, second, and third webpages 410A, 410B, and 410C.

Figure 5:
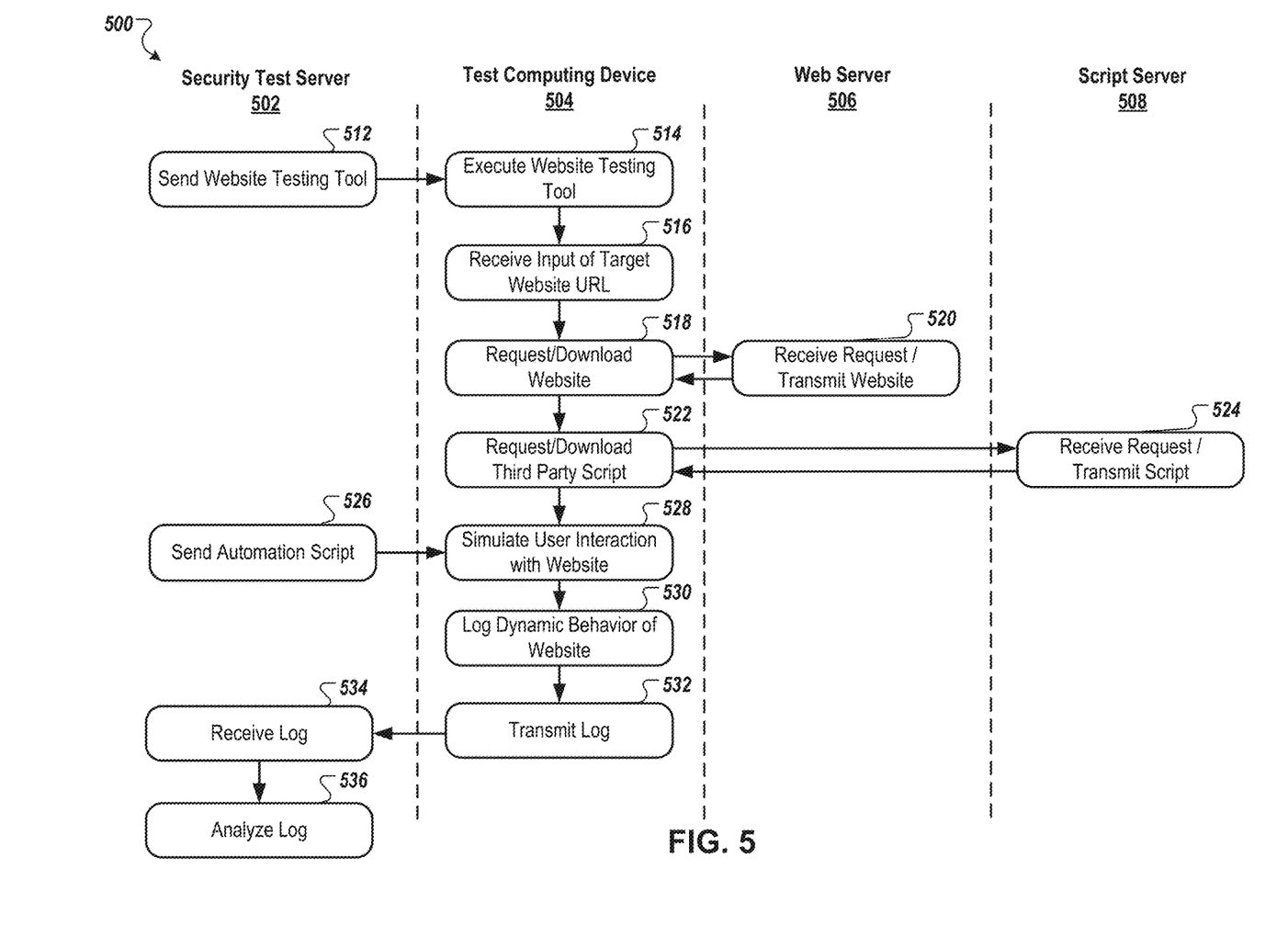
FIG. 5 is a flowchart of an example method for dynamically testing a website for security vulnerabilities.

FIG. 5 is a flowchart of an example method 500 for dynamically testing a website for security vulnerabilities. The method 500 can be generally performed one or more of a security test server 502, a test computing device 504, a web server 506, and a script server 508. The method 500 can be used in the network architecture 100 described in FIG. 1. For example, the security test server 502, the test computing device 504, the web server 506, and the script server 508 can be the website security testing system 102, the test client device 104, the web server 106, and the third party script server 108, respectively.

The method 500 can begin at block 512 in which the security test server 502 sends a website testing tool to the test computing device 504. An example of the website testing tool can include the website testing wrapper 130 described herein. Upon receiving the website testing tool, the test computing device 504 executes the website testing tool (Block 514). The website testing tool can be manually by a user (e.g., a security administrator or analyst) or automatically run when it is received by the test computing device 504.

The test computing device 504 can receive an input of a URL of a target website to be tested (Block 516). The test computing device 504 can provide a user interface that enables a user to input a URL of the target website. At Blocks 518 and 520, the test computing device 504 transmits a request for the target website to the web server 506, and the web server 506 receives the request. Further, the web server 506 transmits the requested target website, and the test computing device 504 receives it. At Blocks 522 and 524, the test computing device 504 requests one or more third party scripts included in the target website, and the script server 508 receives the request. Further, the script server 508 transmits the requested third part scripts, and the test computing device 504 receives them.

At Block 526, the security test server 502 can transmit an automation script (e.g., the automation script 132) to the test computing device 504. The automation script being transmitted can be selected from a plurality of automation scripts so that the selected automation script is formatted for the target website and written to interact with the target website.

At Block 528, the test computing device 504 can simulate a user interaction with the target website. For example, the test computing device 504 can generate simulated user inputs to interact with the webpages based on the automation script.

At Block 530, the test computing device 504 can log a dynamic behavior of the target website that has been monitored in runtime of the website. The dynamic behavior of the target website includes a functional user flow through the target website which results from the simulated user interaction with the target website. The test computing device 504 can transmit the log to the security test server 502 (Block 532), and the security test server 502 receives the log (Block 534).

At Block 536, the security test server 502 can be used to analyze the log 134 to identify any malicious behavior of the website 120. For example, a user (e.g., a security administrator or analyst) can review the log 134, and identify any abnormal or malicious behavior of the website 120 and/or determine if any of the third party scripts have been compromised. Alternatively or in addition, the security testing server 502 can automatically analyze the log and identify any abnormal or malicious behavior and/or compromised third party scripts. The analysis of the log can be performed based on a rule which distinguishes between normal behavior and abnormal behavior of the website.

Figure 6:
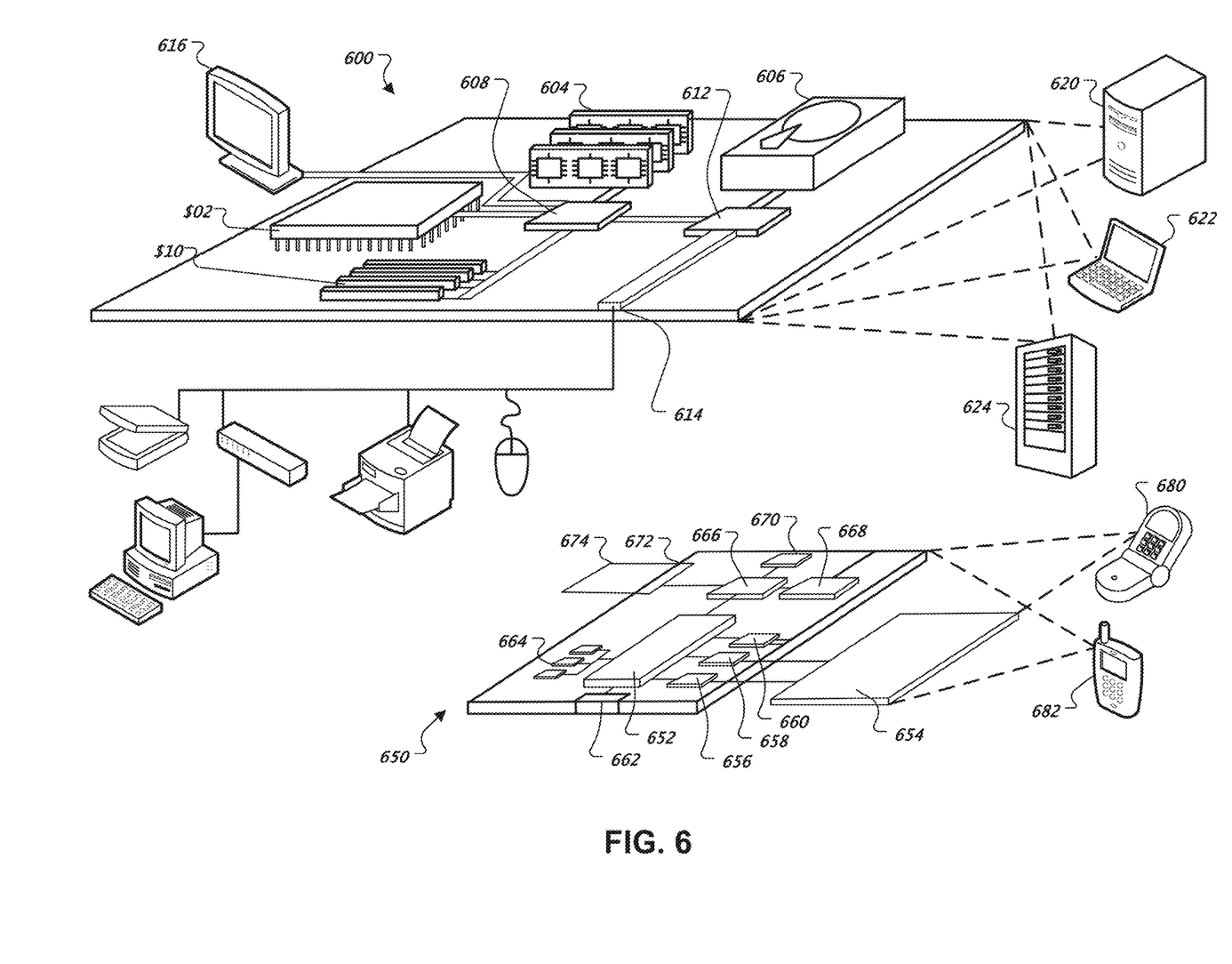
FIG. 6 is a block diagram of computing devices that may be used to implement the systems and methods described in this document.

FIG. 6 is a block diagram of computing devices 600, 650 that may be used to implement the systems and methods described in this document, as either a client or as a server or plurality of servers. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be examples only, and are not meant to limit implementations described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high-speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high-speed controller 608 manages bandwidth-intensive operations for the computing device 600, while the low speed controller 612 manages lower bandwidth-intensive operations. Such allocation of functions is an example only. In one implementation, the high-speed controller 608 is coupled to memory 604, display 616 (e.g., through a graphics processor or accelerator), and to high-speed expansion ports 610, which may accept various expansion cards (not shown). In the implementation, low speed controller 612 is coupled to storage device 606 and low speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chip set of chips that include separate and multiple analog and digital processors. Additionally, the processor may be implemented using any of a number of architectures. For example, the processor may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provided, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652 that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Additionally computing device 600 or 650 can include Universal Serial Bus (USB) flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for testing a website vulnerability, the method comprising:
transmitting, from a website security test server to a test client device, a website testing wrapper and an automation script, wherein the website testing wrapper is executable by the test client device to test one or more websites, wherein the test client device is simulated in a testing environment that is isolated from the website security test server and a plurality of actual client devices interacting the one or more websites, and wherein the automation script is configured to automatically simulate a series of user actions of users performed on the test client device to interact with the one or more websites; and
executing, using the test client device, the website testing wrapper and the automation script in the testing environment isolated from the website security test server and the plurality of actual client devices, the executing including:
receiving, at the test client device, an input of a URL of a target website, the target website being hosted by a web server that is different from the website security test server;
transmitting, using the test client device and to the web server, a request for the target website, the request including the received URL of the target website;
retrieving, from the web server and using the test client device, website code of the target website, the website code identifying a script that is part of the target web site;
transmitting, by the test client device and to a script server, a request for the script;
receiving, from the script server and at the test client device, the script identified by the website code;
establishing, at the test client device and based on the website testing wrapper, hooks configured to intercept operations of the retrieved website code and the received script while the target website runs in real time on the test client device;
generating, by the automation script running at the test client device, simulated user inputs that interact with the target website;
executing, by the automation script running at the test client device and based on the simulated user inputs, the retrieved website code and the received script within the website testing wrapper;
monitoring, by the automation script running at the test client device, a dynamic behavior of the target website including a functional user flow through the target website based on the simulated user inputs, by intercepting, using the hooks, the operations of the retrieved website code and the received script according to the simulated user inputs;
generating, by the automation script running at the test client device, a log of the dynamic behavior; and
transmitting, by the test client device and to the website security test server, the log of the dynamic behavior, wherein the log of dynamic behavior indicates whether the script retrieved and run as part of the target website is malware.

2. The method of claim 1, receiving the input of the URL comprising:
receiving a user manual input of the URL of the target website while the target website is running in real time for the plurality of actual client devices.

3. The method of claim 1, wherein the one or more hooks are configured to
hook a plurality of attributes in runtime of the website.

4. The method of claim 3, wherein the plurality of attributes include one or more of IP addresses being redirected, ports accessed, ongoing requests, incoming responses, data packets being transmitted, timing of the transmission, URLs of various resources to/from which requests/responses/data are transmitted, cookies, and downloads, other events occurring as a result of executing the website, function calls, messages, and network traffic.

5. The method of claim 1, wherein the script is a third party script, the method further comprising:
downloading the third party script from a third party script server different from the web server.

6. The method of claim 1, wherein executing the website code comprises:
executing code of each of a plurality of webpages in the website.

7. The method of claim 1, wherein the web site testing wrapper includes:
a user input automation engine configured to generate the simulated user inputs based on the automation script.

8. The method of claim 1, wherein the web site testing wrapper includes:
a hooking engine configured to intercept runtime operations of the web site, the hooking engine including the hooks.

9. The client computing device of claim 1, wherein the website testing wrapper includes:
a user input automation engine configured to generate the simulated user inputs based on the automation script; and
a hooking engine configured to intercept runtime operations of the web site, the hooking engine including the hooks.

10. The method of claim 1, wherein the script server is separate from the web server.

11. The method of claim 1, further comprising:
receiving, using the website security test server and from the web server, static website code of the target website; and
analyzing, using the website security test server, the static website code of the target website in combination with the log of the dynamic behavior.

12. The method of claim 1, further comprising:
identifying, using the website security test server, the script as malicious based on a rule for distinguishing between normal behavior and abnormal behavior of the target website including the script.

13. The method of claim 1, wherein the hooks are configured to intercept the operations of the retrieved website code and the received script without interfering with real time operations of the target website for the plurality of actual client devices.

14. A client computing device for testing a website vulnerability, comprising:
a data processing apparatus; and
a memory device storing instructions that when executed by the data processing apparatus cause the client computing device to perform operations comprising:

receiving, from a website security test server, a website testing wrapper and an automation script, wherein the website testing wrapper is executable by the client computing device to test one or more websites, wherein the client computing device is simulated in a testing environment that is isolated from the website security test server and a plurality of other client devices interacting the one or more websites, and wherein the automation script is configured to automatically simulate a series of user actions of users performed on the client computing device to interact with the one or more websites; and executing the website testing wrapper and the automation script in the testing environment isolated from the website security test server and the plurality of other client devices, the executing including:

receiving an input of a URL of a target website, the target website hosted by a web server that is different from the website security test server;

transmitting, to the web server, a request for the target website, the request including the received URL of the target website;

receiving, from the web server, website code of the target website, the website code identifying a script that is part of the target website;

receiving, from a script server, the script identified by the web site code;

establishing, based on the website testing wrapper, hooks configured to intercept operations of the retrieved website code and the received script while the target website runs in real time on the client computing device;

generating, by the automation script, simulated user inputs that interact with the target website;

executing, by the automation script and based on the simulated user inputs, the retrieved website code and the received script within the website testing wrapper;

monitoring, by the automation script, a dynamic behavior of the target website including a functional user flow through the target website based on the simulated user inputs, by intercepting, using the hooks, the operations of the retrieved website code and the received script according to the simulated user inputs;

generating, by the automation script, a log of the dynamic behavior; and transmitting, to the website security test server, the log of the dynamic behavior, wherein the log of dynamic behavior indicates whether the script retrieved and run as part of the target website is malware.

15. The client computing device of claim 14, wherein the operations further comprises:

receiving a user manual input of the URL of the target website while the target website is running in real time for the plurality of other client devices.

16. The client computing device of claim 14, wherein the one or more hooks are configured to hook a plurality of attributes in runtime of the website.

17. The client computing device of claim 16, wherein the plurality of attributes include one or more of IP addresses being redirected, ports accessed, ongoing requests, incoming responses, data packets being transmitted, timing of the transmission, URLs of various resources to/from which requests/responses/data are transmitted, cookies, and downloads, other events occurring as a result of executing the website, function calls, messages, and network traffic.

18. The client computing device of claim 14, wherein the script is a third party script, the operations further comprising:

downloading the third party script from a third party script server different from the web server.

19. The client computing device of claim 14, wherein executing the website code comprises:

executing code of each of a plurality of webpages in the website.

20. A non-transitory computer-readable medium having stored therein a program for causing a computer to execute a process of testing a website vulnerability, the process comprising:

receiving, from a website security test server, a website testing wrapper and an automation script, wherein the website testing wrapper is executable to test one or more websites, wherein the computer is simulated in a testing environment that is isolated from the website security test server and a plurality of client devices interacting the one or more websites, and wherein the automation script is configured to automatically simulate a series of user actions of users performed on the computer to interact with the one or more websites;

executing the website testing wrapper and the automation script in the testing environment isolated from the website security test server and the plurality of client devices;

receiving an input of a URL of a target website, the target website hosted by a web server that is different from the website security test server;

transmitting the URL to the web server to retrieve website code of the target web site;

receiving the website code of the target website from the web server, the website code identifying a third party script that is part of the target website;

receiving, from a third party script server different from the web server, the third party script identified by the website code;

establishing, based on the website testing wrapper, hooks configured to intercept operations of the retrieved website code and the received third party script while the target website runs in real time on the computer;

generating, by the automation script, simulated user inputs that interact with the target website;

executing, by the automation script and based on the simulated user inputs, the website code and the third party script within the website testing wrapper;

monitoring, by the automation script, a dynamic behavior of the target website interacting with the simulated user inputs, by intercepting, using the hooks, the operations of the website code and the third party script according to the simulated user inputs;

generating, by the automation script, a log of the dynamic behavior; and transmitting, to the website security test server, the log of the dynamic behavior, wherein the log of the dynamic behavior indicates whether the third party script retrieved and run as part of the target website is malware.

* * * * *